United States Patent [19]

Marantette et al.

[11] 3,915,442

[45] Oct. 28, 1975

[54] RECTANGULAR COORDINATE POSITIONING SYSTEM

[76] Inventors: William F. Marantette; Ruth B. Marantette, both of 20624 Earl St., Torrance, Calif. 90503

[22] Filed: Mar. 25, 1975

[21] Appl. No.: 561,997

[52] U.S. Cl. ................ 269/71; 29/203 P; 29/203 S; 90/62 A; 269/55; 269/71; 269/309

[51] Int. Cl.$^2$ ............................................ B23Q 1/04

[58] Field of Search .................... 269/55, 56, 71–73, 269/309; 29/203 P, 203 J, 203 S; 248/23; 51/230, 231; 90/62 R, 62 A; 254/124

[56] References Cited

UNITED STATES PATENTS

| | | | |
|---|---|---|---|
| 2,774,131 | 12/1956 | Crane | 51/230 |
| 3,143,791 | 8/1964 | Lanaman et al. | 269/55 |
| 3,499,642 | 3/1970 | Porter | 269/71 |
| 3,638,933 | 8/1970 | Burnette et al. | 269/309 |
| 3,740,048 | 6/1973 | Lassy et al. | 269/309 |
| 3,865,347 | 2/1975 | Pase | 254/124 |

*Primary Examiner*—Al Lawrence Smith
*Assistant Examiner*—Robert C. Watson
*Attorney, Agent, or Firm*—Ralph B. pastoriza

[57] ABSTRACT

The opposite ends of an elongated carriage mounted on parallel rails are constrained to precise equal movements along the rails, by means of a cylindrical torque tube. The axis of this torque tube is spaced from and parallel to the longitudinal dimension of the carriage so as to be at right angles to the direction of the rails and includes identically dimensioned laterally extending rigid members and cooperating links pivoted between the extending ends of the members and the opposite ends of the carriage respectively. Any twisting of the carriage as would occur should one opposite end of the carriage tend to get ahead of the other opposite end, is thereby inhibited by the torque tube.

6 Claims, 3 Drawing Figures

RECTANGULAR COORDINATE POSITIONING SYSTEM

This invention relates generally to work positioning systems and more particularly to a rectangular coordinate positioning system for enabling the accurate positioning along orthogonal coordinates of a work table.

BACKGROUND OF THE INVENTION

The positioning system of this invention will have several applications. For purposes of the present invention, however, it will be described in conjunction with the simultaneous drilling of holes through several boards such as printed circuit boards mounted in side-by-side relationship on a single work table.

In the drilling of holes in printed circuit boards which holes are utilized for mounting various electrical components, the usual practice is to provide a master positive film of rectangular dimensions corresponding to the printed circuit board and including spots or other marks where holes are to be drilled. This master film is placed on a work table alongside several circuit boards through which the holes are to be drilled simultaneously. A corresponding number of overhead drills are provided and by mounting the work table for movement in both forward and backward and sidewise directions, any particular coordinate point identifying the position of a hole to be drilled can readily be positioned beneath the drills by aligning the hole on the positive master with a fixed reference.

It will be appreciated that if a relatively large number of circuit boards in side-by-side relationship are to be drilled simultaneously, the work table is necessarily elongated in one direction to support the boards. The master positive for determining the proper positioning of the work table is normally located at one end of the table and it will be appreciated that when the table is moved forwardly or rearwardly; that is, in a direction at right angles to the elongation direction of the table the furthest circuit board on the opposite end of the table may not always be precisely positioned relative to the master at the one end of the table. In other words, because of the physical length of the table it is very difficult to provide a mounting means for the table which will assure that the opposite ends of the table move through precisely the same distances.

The foregoing can better be appreciated by considering the mechanism employed for mounting the work table. Usually, there are provided a pair of spaced rails upon which the opposite ends of an elongated carriage are mounted for movement. The carriage in turn may include a second pair of rails at right angles to the first pair which support the work table. With this arrangement, the work table can move forwardly and rearwardly along the first pair of spaced rails by movement of the carriage on these rails and also be moved in a sidewise direction by movement of the work table along the second pair of rails supported by the table.

The first mentioned rails supporting the carriage are spaced relatively far apart. Further, while every effort is made to assure that these rails are precisely aligned in parallel relationship, each of the rails themselves cannot be made absolutely straight. In reality, there is usually a variation which may be as much as 1 mill per foot of the "straightness" of the rail. This variation coupled with the relatively wide separation of the rails can result in a tendency for one end of the carriage to move ahead or drop behind the other end of the carriage when the carriage is moved along the rails. Such differences in the distance through which the opposite ends of the carriage moves on each of the rails results in the above referred-to inaccuracies in the position of the drill holes in the circuit boards, particularly those that are located a considerable distance from the master film.

BRIEF DESCRIPTION OF THE PRESENT INVENTION

With the foregoing considerations in mind, the present invention contemplates the provision of a rectangular coordinate positioning system wherein a relatively elongated carriage or work table may be utilized so that a large number of boards may be drilled or otherwise operated on simultaneously and yet wherein extreme accuracy is assured in the movement of the carriage when positioning the various boards so that all points on the surface of the work table move through precisely the same distances when moving the table to a desired rectangular coordinate position.

More particularly, the invention provides for the movement of an elongated carriage in a given rectilinear direction at right angles to the long dimension of the carriage by providing a frame supporting a pair of spaced parallel rails running in the rectilinear direction. The carriage is mounted at opposite longitudinal end portions to the rails respectively for movement in this given rectilinear direction. A torque tube has a longitudinal axis parallel to and spaced from the longitudinal dimension of the carriage so as to be at right angles to the direction of the rails, the tube being mounted to the base frame for rotation about its own axis. First and second identically dimensoined coupling means are provided between opposite end portions of the torque tube and the opposite longitudinal end portions of the carriage, the torque tube and coupling means constraining movement of the opposite longitudinal end portions of the carriage to precisely equal distances in the rectilinear direction along the rails respectively.

A second pair of parallel rails may in turn be mounted on the carriage to support a work table for movement in a direction at right angles to the first mentioned rectilinear direction so that the work table itself can be positioned at any rectangular coordinate point.

BRIEF DESCRIPTION OF THE DRAWINGS

A better understanding of this invention will be had by now referring to one embodiment thereof as illustrated in the accmopanying drawings in which.

DETAILED DESCRIPTION OF THE INVENTION

Figure 1:
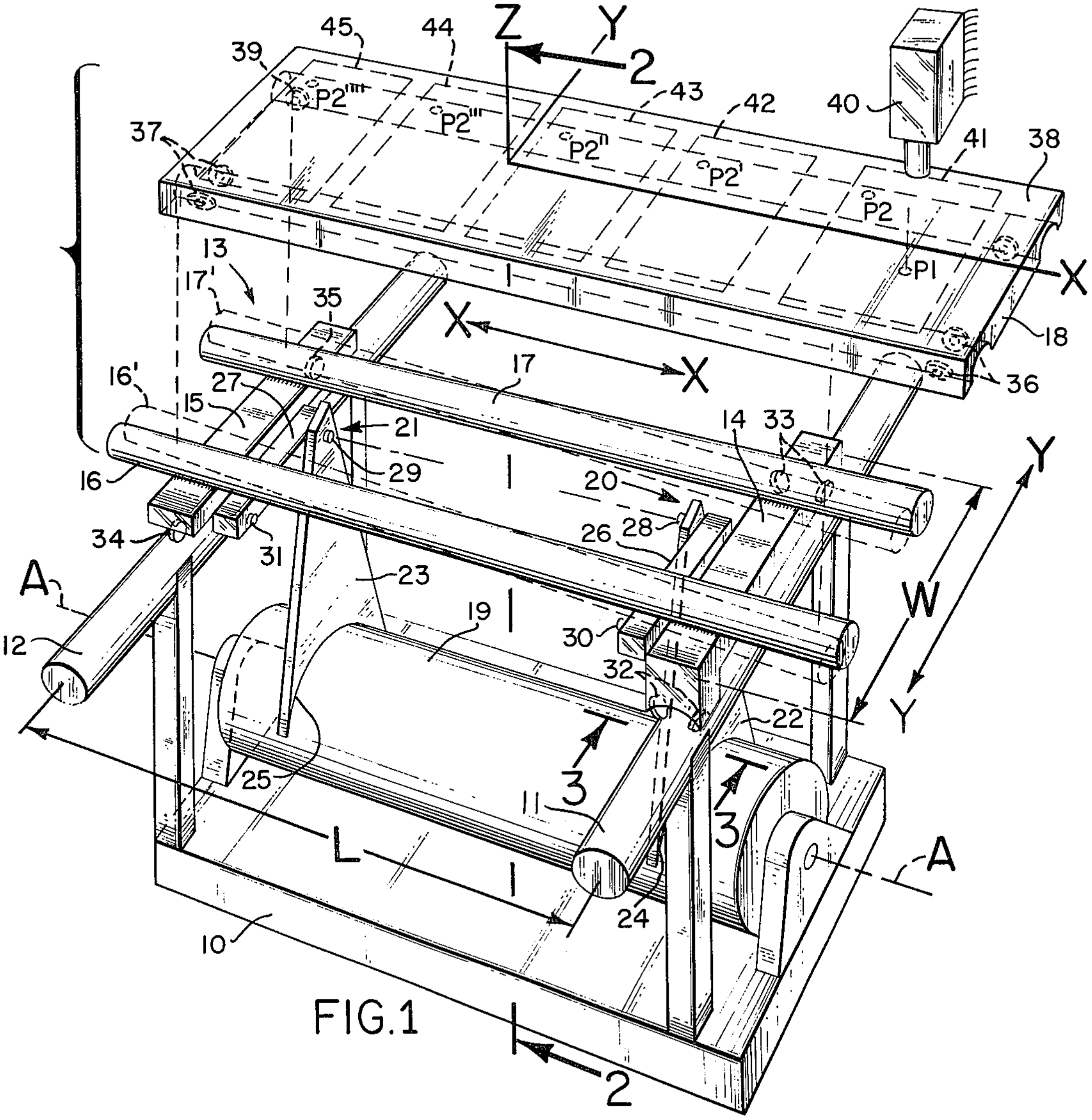
FIG. 1 is an overall perspective view partly exploded illustrating the basic components making up the positioning system of the invention.

Referring first to the lower portion of FIG. 1, there is shown a base frame 10 supporting a first pair of parallel rails 11 and 12. These rails run in a first direction corresponding to a first rectangular coordinate axis. In FIG. 1, this axis runs in a forward and rearward direction and is designated by the double-headed arrow Y—Y to the right of the structure.

An elongated carriage designated generally by the arrow 13 has opposite longitudinally spaced ends 14 and 15 respectively mounted on the first pair of rails 11 and 12 for movement therealong in the first Y-axis coordinate direction. Carriage 13 also includes a second pair of parallel rails 16 and 17 running in a longitudinal second direction, at right angles to the first direction of the first pair of rails, corresponding to a second rectangular coordinate axis as indicated by the double-headed arrow X—X.

Shown exploded above the second pair of rails 16 and 17 is an elongated work table 18 mounted on the rails 16 and 17 for movement therealong in the second or X-axis direction.

Rectangular coordinate axes Y and X are indicated on the top surface of the work table 18 and it will be appreciated that with the mounting described thus far, the entire table 18 may be moved forward or rearwardly or in a sidewise direction so that any point on the table can be positioned to a particular rectangular coordinate on the rectangular Y-X axis system.

Positioned below the first pair of rails 11 and 12 is an elongated torque tube having a longitudinal axis A—A parallel to the second pair of rails 16 and 17. As shown, this torque tube is mounted for rotation about the axis A—A to the frame 10 and includes first and second coupling means designated generally at 20 and 21 secured respectively adjacent to opposite ends of the torque tube and to the opposite end portions 14 and 15 of the carriage adjacent to corresponding opposite ends of the second pair of rails. While the tube 19 is shown as cylindrical, it could have other cross-sectional shapes, such as square.

The coupling means 20 and 21 respectively include rigid members 22 and 23 secured to and extending laterally from the periphery of the torque tube as at 24 and 25. Link members 26 and 27, respectively, are in turn pivoted at opposite ends to the extending ends of the rigid members as at 28 and 29 and to the opposite end portions of the carriage as at 30 and 31. As indicated by the axis lines for these pivots, the rotational axes of movement are parallel to each other and to the axis of the torque tube 19. The rigid members and links are identically dimensioned to each other, one rigid member and one link each having length adjustment means to adjust out-production tolerance variations to make the motion at the carriage ends identical. All pivot points are of the preloaded/anti-backlash type.

As a consequence of the foregoing coupling arrangement, it will be appreciated that movement of the opposite ends of the carriage 14 and 15 along the first pair of rails 11 and 12 respectively is constrained to precisely equal amounts by the torque tube so that any twisting of the carriage and second pair of rails relative to the first pair of rails is inhibited. In other words, the stiffness of the torque tube 19 will prevent one or the other of the end portions 14 and 15 of the carriage from moving ahead or behind the other portion as the entire carriage moves along the rails 11 and 12. In the absence of the torque tube and coupling arrangement, it is possible that the end portion 15, for example, might move slightly ahead of the end portion 14 which would result in the rails 16 and 17 assuming a slightly twisted position as depicted by the dashed lines 16' and 17'. Accordingly, by providing the torque tube and coupling means as described it is assured that corresponding points on the surface of the table 18 carried by the carriage will all move through precisely the same distances when the table is moved in the Y—Y direction.

The torque tube also improves dynamic characteristics. If the table is near the limit of its X-axis excursion, the table and contents will present an unbalanced load to the Y-axis lead screw causing the table to skew during rapid accelerations and decelerations. Without the torque tube a low frequency torsional oscillation would occur which would take an appreciable length of time to dampen before drilling could proceed. However, with the torque tube the skewing is greatly reduced, the oscillation frequency is greatly increased, and the time required to dampen is greatly reduced.

To minimize friction of motion of the carriage along the rails, one opposite end of the carriage such as 14 includes tandem pairs of rollers 32 and 33 engaging circumferentially spaced points on the rail 11, the opposite end of the carriage 15 being provided with tandem single rollers 34 and 35 engaging the other rail 12. With this arrangement, there is no redundancy in the guiding of the carriage along the rails, any slight non-parallel portions of the rails being accommodated by the single rollers on the rail 12. However, pairs of rollers could be used in place of the single tandem rollers in certain heavy duty applications. Further, the rail engaging means could take modified forms such as ball bearings or air pads. The rails themselves could be square or flat surfaces or V-grooved. Lubrication could be air or oil.

Similarly, the work table 18 is mounted on the second pair of rails 16 and 17 as by tandem pairs of rollers 36 and 37 on one longitudinal edge of the table engaging circumferentially spaced points on the rail 16 of the second pair and tandem single rollers 38 and 39 on the opposite longitudinal edge of the work table engaging the other rail 17.

Figure 2:
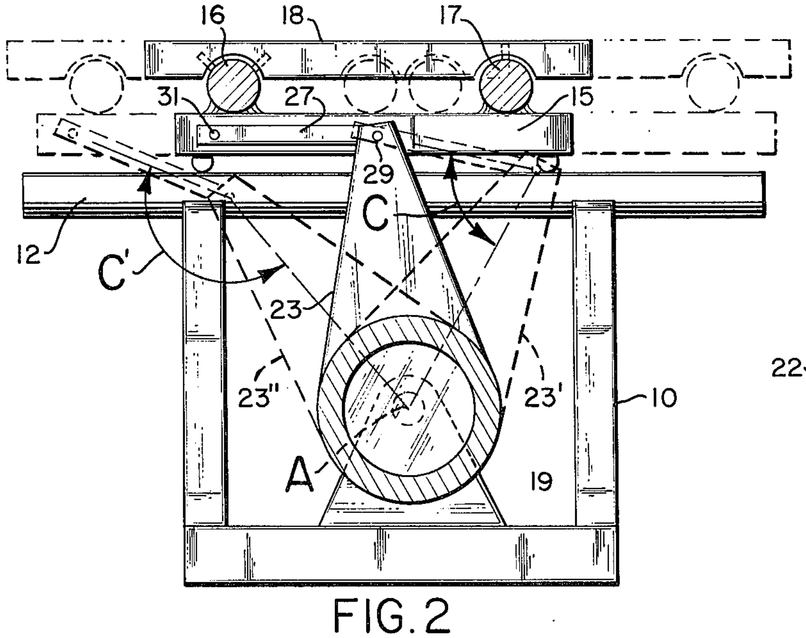
FIG. 2 is a cross section looking in the direction of the arrows 2—2 of FIG. 1; and, FIG. 3 is an enlarged fragmentary perspective view looking in the direction of the arrows 3—3 of FIG. 1.

FIG. 2 depicts in better detail the manner in which the coupling means between the torque tube and the carriage functions. Thus, it will be clear that the spacing of the axis of the torque tube from the carriage member, the length of each rigid member and the length of each link is such that movement of the carriage along the first pair of rails from one extreme position to the other results in the angle between each link and rigid member to which it is pivoted to vary from an acute to an obtuse angle. Thus, as shown in FIG. 2, when the rigid member 23 is in the dotted line position 23' as shown, this angle is indicated at C whereas when the rigid member 23 swings towards the opposite extreme position of the carriage, the angle becomes obtuse as indicated at C'.

Since the dimensioning of the two coupling means at each end of the torque tube is identical, it will be appreciated that the distance between the pivot point 31 for the link 27 and the axis A of the torque tube will always be precisely equal to the corresponding distance of the other coupling means; that is, from the pivot point 30 to the axis of the torque tube as for the coupling means 20 shown in FIG. 1.

As a result of all of the foregoing and as heretofore described, the stiffness of the torque tube 19 will thus prevent one end portion from moving slightly ahead or behind the other end portion as the carriage travels along the first pair of rails 11 and 12.

Figure 3:
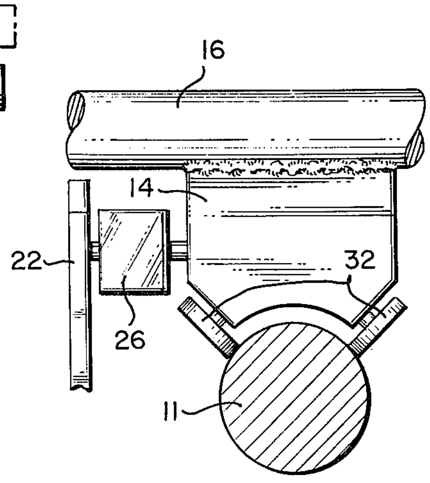

FIG. 3 shows in enlarged view the rail 11 and the pair of rollers 32 engaging the rail at circumferentially spaced points. It will be understood that the other pair of tandem rollers 33 as described in FIG. 1 are similarly mounted to the end portion 14.

With respect to the foregoing and with reference once again to FIG. 1, the width of the carriage which corresponds substantially with the spacing between the tandem pairs of rollers 32 and 33 engaging the rail 11, is designated W. The overall length of the carriage which corresponds to the spacing between the first pair of rails 11 and 12, on the other hand, is indicated at L and it will be noted that L is substantially greater than W. Where the spacing between the rails such as the second pair of rails 16 and 17 is relatively small, there is not posed the problem of twisting or one portion of a member riding on one rail getting ahead or behind the other portion. Such situation only exists where the rails are relatively widely spaced as is the case for the first and second rails 11 and 12.

Referring now to the upper portion of FIG. 1 and particularly the work table 18, the importance of the positioning system of the present invention in the case of drilling printed circuit boards will be better appreciated. As shown, there is schematically indicated a light source 40 disposed above the table arranged to direct a beam of light vertically downwardly onto a master positive 41 positioned on the right hand portion of the table. A photo electric cell means (not shown) is disposed beneath the master positive 41, this positive including a plurality of precisely positioned transparent points, two of which are indicated at P1 and P2.

Also shown on the surface of the work table 18 are a plurality of printed circuit boards designated schematically by dashed lines at 42, 43, 44 and 45 in side-by-side relationship. A corresponding number of drills (not shown) would be provided above these boards in stationary positions relative to the X-Y coordinate system but capable of movement in a vertical or Z-axis direction.

In operation, the work table 18 is moved in the coordinate X- and Y-axis directions until, for example, the hole P1 is positioned to pass light from the light source 40 to the photo electric cell means. When the table reaches this position, it is automatically stopped and the drills are actuated to simultaneously drill holes through the various printed circuit boards at points corresponding precisely to the location of P1 relative to the master positive 41. When a next hole is to be drilled, the table is moved, for example, to the point P2 by rearward movement of the carriage along the rails 11 and 12 and thence sidewise movement of the carriage on rails 16 and 17 to the right until the point P2 is positioned exactly under the beam from the light source 40 at which point the table is stopped. These motions in the Y- and X-direction can be carried out simultaneously. The drills are then again actuated to drill corresponding holes at positions on the boards designated in FIG. 1 at P2′, P2″, P‴ and P2⁗.

Because of the relatively long distance between the master positive 41 and the last of the printed circuit boards 45, in the absence of the torque tube arrangement and coupling means as described, it can be appreciated that the final position of the point P2⁗ may not exactly correspond in the direction of the Y-axis to the point P2 on the master positive 41. However, with the torque tube and coupling arrangement described, it is assured that this end portion of the elongated table will be precisely positioned to assure the proper correspondence between the points P2⁗ and the point P2.

While the foregoing invention has been described in conjunction with the drilling of printed circuit boards, as stated heretofore, it will have applications in other fields wherein it is desired to position a relative elongated carriage or work table along a coordinate axis, such that all points on the surface of the table will move precisely through the same distances. Normally, the application of the torque tube would be desirable in such situations wherein the length L shown in FIG. 1 between the first pair of rails 11 and 12 is greater than twice the width of the carriage or table carried by the rails. In the case of printed circuit boards, this length dimension would be considerably greater than twice the width particularly when a large number of circuit boards in side-by-side relationship are to be drilled simultaneously.

Minor changes falling within the scope and spirit of this invention will occur to those skilled in the art. The rectangular coordinate positioning system is accordingly not to be thought of as limited to the exact structure set forth by way of example.

What is claimed is:

1. A positioning system wherein an elongated carriage is to be moved in a given rectilinear direction at right angles to the long dimension of the carriage, comprising, in combination:

a. a frame supporting a pair of spaced parallel rails running in said rectilinear direction;

b. means mounting opposite longitudinal end portions of said carriage to said rails respectively for movement along the rails in said given rectilinear direction;

c. a torque tube having a longitudinal axis parallel to and spaced from the longitudinal dimension of said carriage so as to be at right angles to the direction of said rails, said tube being mounted to said frame for rotation about its axis; and, d. first and second identically dimensioned coupling means between opposite end portions of said torque tube and said opposite longitudinal end portions of said carriage constraining movement of said opposite longitudinal end portions of said carriage to precisely equal distances in said rectilinear direction, respectively.

2. A positioning system according to claim 1, in which each of said coupling means includes a rigid member secured to and extending laterally from a peripheral end portion of said torque tube; and a link member pivoted at one end to said rigid member and pivoted at its other end to the corresponding end of said carriage, the axis of each pivot being parallel to the axis of said torque tube.

3. A rectangular coordinate positioning system comprising, in combination:

a. base frame;

b. a first pair of parallel rails secured to said base frame and running in a first direction corresponding to a first rectangular coordinate axis;

c. a carriage having opposite longitudinally spaced ends mounted on said first pair of rails respectively for movement therealong in said first direction and including a second pair of parallel rails running in a longitudinal second direction, at right angles to said first direction, corresponding to the second rectangular coordinate axis;

d. an elongated work table mounted on said second pair of rails for movement therealong in said second direction;

e. a torque tube having a longitudinal axis parallel to and spaced from said second pair of parallel rails, said torque tube being mounted to said base frame for rotation about said axis; and f. first and second coupling means secured respectively adjacent to opposite ends of said torque tube and to said opposite end portions of said carriage adjacent to corresponding opposite ends of said second pair of rails, each of said coupling means including a rigid member secured to and extending laterally from the periphery of said torque tube; and a link member pivoted at opposite ends to the extending end of said rigid member and to said carriage, the rotational axes of pivoted movement of the link member being parallel to each other and to the axis of said torque tube whereby movement of the opposite ends of said carriage along said first pair of rails respectively is constrained to precisely equal amounts by said torque tube so that any twisting of the carriage and second pair of rails relative to the first pair of rails is inhibited so that all points on the surface of said work table move through precisely the same distances when moving the table to desired rectangular coordinate positions.

4. A system according to claim 3, in which the spacing of the axis of said torque tube from said carriage member, the length of each rigid member, and the length of each link is such that movement of said carriage along said first pair of rails from one extreme position to the other results in the angle between each link and rigid member to which it is pivoted to vary from an acute to an obtuse angle.

5. A system according to claim 3, in which the spacing between said first pair of rails corresponding substantially to the longitudinal distance between said opposite ends of said carriage as measured in said second direction, is at least twice the width of the carriage as measured in said first direction.

6. A system according to claim 3, in which one opposite end of said carriage includes tandem pairs of rollers engaging circumferentially spaced points on one of said first pair of rails, the other opposite end of said carriage including tandem single rollers engaging the other of said first pair of rails, and in which one longitudinal edge portion of said work table includes tandem pairs of rollers engaging circumferentially spaced points on one of said second pair of rails, the opposite longitudinal edge of the work table including tandem single rollers engaging the other of said pair of rails.

* * * * *